US012789757B2

(12) United States Patent
Iotti

(10) Patent No.: US 12,789,757 B2
(45) Date of Patent: Nov. 10, 2026

(54) SYSTEM FOR STABILIZING SELF-PROPELLED OPERATING MACHINES

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 3 days.

(21) Appl. No.: 19/082,954

(22) Filed: Mar. 18, 2025

(65) Prior Publication Data

US 2025/0296534 A1 Sep. 25, 2025

(30) Foreign Application Priority Data

Mar. 19, 2024 (IT) ........................ 102024000006070

(51) Int. Cl.
*B60S 9/04* (2006.01)
*B66C 23/80* (2006.01)
(Continued)

(52) U.S. Cl.
CPC ....................................... *B60S 9/04* (2013.01)

(58) Field of Classification Search
CPC ...... B60S 9/00; B60S 9/02; B60S 9/04; B66C 23/80; B66F 9/06; B66F 9/0655;
(Continued)

(56) References Cited

U.S. PATENT DOCUMENTS 3,019,913 A * 2/1962 Bowman ................. E02F 9/085 212/305
3,279,622 A * 10/1966 Person .................... B66C 23/80 212/304

(Continued)

FOREIGN PATENT DOCUMENTS

EP 2280899 B1 * 11/2015 .............. E02F 9/085
EP 3031769 A1 6/2016

(Continued)

OTHER PUBLICATIONS

Description Translation for EP 3424869 from Espacenet (Year: 2019).*

(Continued)

*Primary Examiner* — Daniel M. Keck
(74) *Attorney, Agent, or Firm* — Chrisman Gallo Tochtrop LLC

(57) ABSTRACT

A method for controlling a scissor stabiliser of self-propelled operating machines that includes a pair of rotatable telescopic stabilising arms and each arm includes a first segment rotatable between a raised position and an operating position; a second segment, slidable relative to the first segment and provided with a foot for contact with the ground; wherein the stabiliser can be activated between an active configuration and an inactive configuration. The stabilisers are brought from the active configuration to the inactive configuration by movements which include a synchronous phase in which they actuate simultaneously in at least one stretch of the rotation of the first segments, in the sense that it moves from the operating position to the raised position and at least one stretch of the sliding of the second segments, in the direction from the extended position to the closed position.

20 Claims, 5 Drawing Sheets

(51) Int. Cl.

| | |
|---|---|
| ***B66F 9/06*** | (2006.01) |
| ***B66F 9/065*** | (2006.01) |
| ***B66F 9/075*** | (2006.01) |
| ***B66F 11/04*** | (2006.01) |
| ***B66F 17/00*** | (2006.01) |

(58) Field of Classification Search
CPC ...... B66F 9/075; B66F 9/07559; B66F 11/04; B66F 17/003; B66F 17/006
USPC ............ 280/6.15, 6.153, 6.154, 6.155, 6.156
See application file for complete search history.

(56) References Cited

U.S. PATENT DOCUMENTS

| | | | | | |
|---|---|---|---|---|---|
| 3,945,666 | A * | 3/1976 | Fritsch | B66C 23/80 | 280/765.1 |
| 3,958,813 | A * | 5/1976 | Carey | B66C 23/80 | 280/765.1 |
| 4,124,226 | A | 11/1978 | Phillips | | |
| 2006/0123672 | A1* | 6/2006 | Ichimura | E02F 9/22 | 37/348 |

FOREIGN PATENT DOCUMENTS

| | | | | | |
|---|---|---|---|---|---|
| EP | 3424869 | A1 | | 1/2019 | |
| ES | 2635739 | T3 | * | 10/2017 | E06C 5/04 |
| JP | H0724436 | Y2 | * | 6/1995 | |
| JP | H0728208 | Y2 | * | 6/1995 | |
| JP | 2000144806 | A | * | 5/2000 | |
| WO | 2014/162191 | A1 | | 10/2014 | |

OTHER PUBLICATIONS

Italian Search Report of Italian Patent Application No. 202400006070, dated Sep. 30, 2024, 7 pages.

* cited by examiner

SYSTEM FOR STABILIZING SELF-PROPELLED OPERATING MACHINES

This invention relates to a system for stabilising self-propelled operating machines, in particular rotary telescopic handlers or "telehandlers".

There are prior art telescopic handlers, consisting of a vehicle equipped with a movable frame on wheels, which comprises a platform mounted on the frame, which in turn mounts the driver's cab and an operating arm which can be extended telescopically.

At the distal end of the arm there is an apparatus for lifting or moving loads, such as, for example, a fork, a cage, a lateral transfer unit, a hoist, etc.

In order to lift and move loads at great heights and with a significant "range" it is necessary to stabilise the vehicle, raising the wheels above the ground.

There are prior art stabilisers for telescopic handlers of the so-called "scissor lift" type, consisting of two stabilising units, provided at the front and at the rear of the vehicle and mounted on its frame close to the wheels.

Each stabilising unit comprises a pair of arms rotatable and extendable telescopically, usually with a single sliding member, which have respective distal ends, designed to be rested on the ground by means of supporting feet, and proximal ends, hinged to a supporting frame.

In practice, the stabilising arms are positioned crossed relative to each other and, during the lifting, move like a pair of scissors.

Once the operations for moving the loads have been completed, the stabilisers are moved to the non-operating configuration in which they have the minimum overall dimensions, thus lowering the machine until resting the wheels on the ground.

A first example of the sequence comprises the arms rotating upwards, until the wheels rest on the ground. During this step, the sliding members protrude from the relative first segment or "sleeve" and are therefore still extracted. At this point, the arms are rotated upwards in such a way as to be horizontal, parallel to each other; the sliding members are retracted completely only after the arms have reached the horizontal position, concluding the operations for recovery and enabling the operator to start the vehicle drive.

Although the prior art solution allows a correct recovery of the stabilisers, the sector has for some time felt the need to speed up this operation to allow a greater efficiency of use of the operating machines, which represent a limited resource since thy are notoriously very expensive and bulky.

In this context, the technical purpose which forms the basis of this invention is to propose a system for stabilising self-propelled operating machines and a method for controlling stabilising, which satisfy the above-mentioned need.

Further features and advantages of the invention are more apparent in the detailed description below, with reference to a preferred, non-limiting, embodiment of a system as illustrated in the accompanying drawings, in which.

Figure 1:
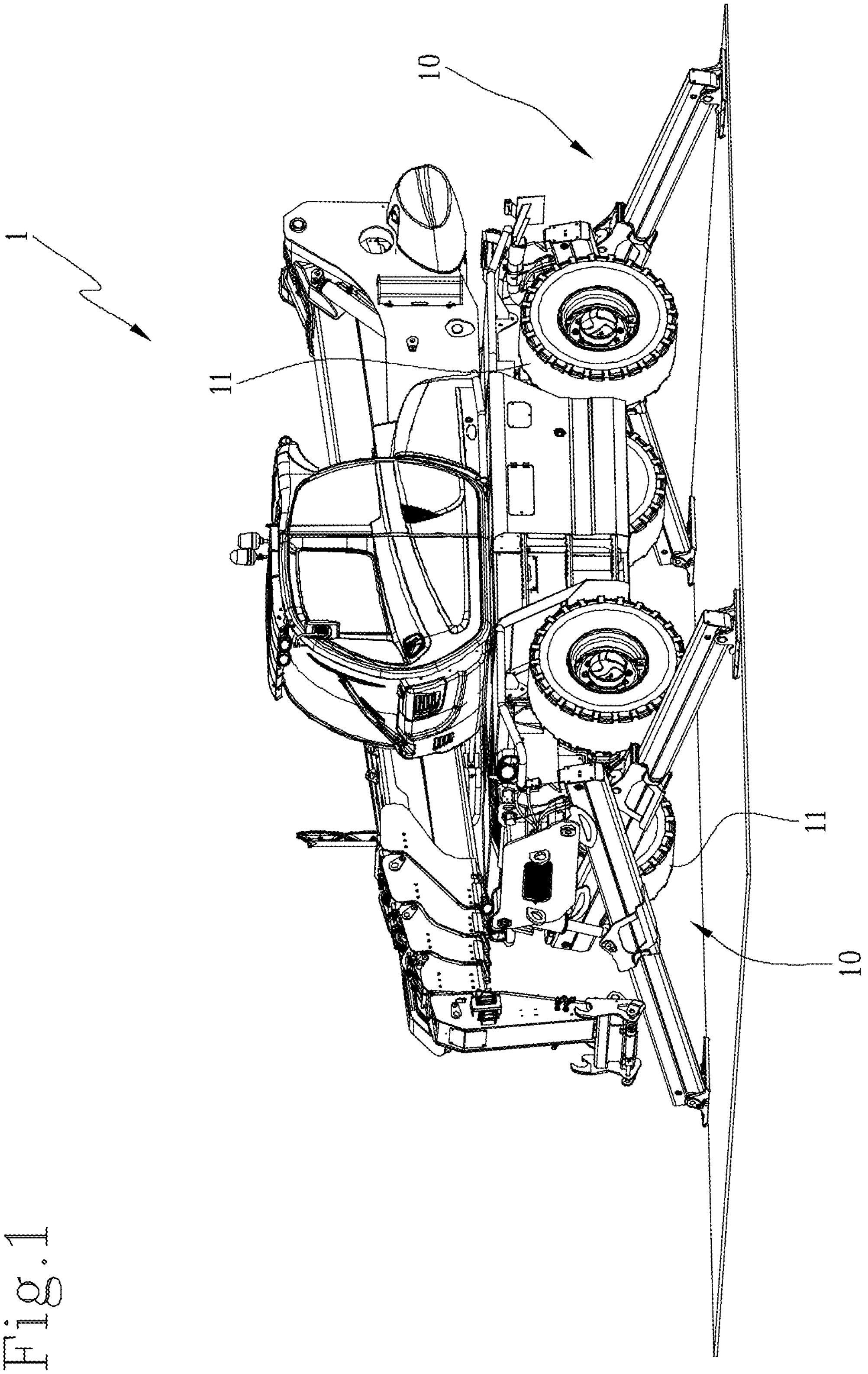
FIG. 1 is an axonometric view of a telehandler which includes the stabilising system according to the invention.

With reference to the accompanying drawings, the numeral 1 denotes in its entirety a vehicle comprising the system according to the invention.

The system according to the invention is structured preferably, but not exclusively, to be implemented on a vehicle 1 consisting of a self-propelled operating machine such as a telehandler or an aerial platform, etc., and may be of the rotary type or even of the fixed type, as shown in FIGS. 1-5.

The system according to the invention includes stabilisers 10 intended to be mounted on the vehicle 1. According to the embodiment illustrated, each stabiliser 10 comprises at least one pair of telescopic stabilising arms 2. In the following description, the telescopic stabilising arms will be referred to simply as arms.

Each arm 2 is provided with a longitudinal axis C.

Preferably, the stabilisers 10 provided in the system according to the invention are of the so-called "scissor" or "X" type, and each include a pair of arms 2, for example with a single sliding member. The two pairs of arms are located, respectively, in a front zone and in a rear zone of the vehicle 1, close to the wheels 11.

It should be noted that when in this description the adjective "horizontal" is used or reference is made to "horizontal" planes, it is used to refer to the horizontality in the case of flat and horizontal ground.

In fact, it is clear that if the ground on which the wheels 11 or stabilisers 10 rest is not regular or is inclined, the "horizontal" reference is inclined accordingly.

According to the preferred but non-limiting embodiment illustrated, the stabilisers 10 includes a supporting structure 100, fixed to or incorporated in the frame of the machine 1, to which the arms 2 of a pair are individually hinged, in a cross-like configuration, so as to be able to move in a counter-rotating fashion, like a pair of scissors.

Still more in detail, the two arms 2 connected to the same supporting structure 100 are mounted one in front of the other, so as to move in parallel planes, generically vertical.

The stabilisers 10 of the proposed system are designed to adopt an active configuration, wherein they stabilise the machine 1, raising the wheels above the ground, and an inactive configuration, wherein the wheels 11 are rested on the ground.

In the inactive configuration of the stabilisers, the arms 2 are in a raised position, wherein they are distanced from the ground and withdrawn into the vehicle (see FIG. 5), and in particular freely allow the driving of the vehicle 1. In the active configuration (FIGS. 1 and 2), the arms 2 rest on the ground to stabilise the vehicle. In the description which follows, the active or inactive configuration is associated both with the stabilisers 10 and with the arms 2 of the stabilisers 10.

Figure 3:
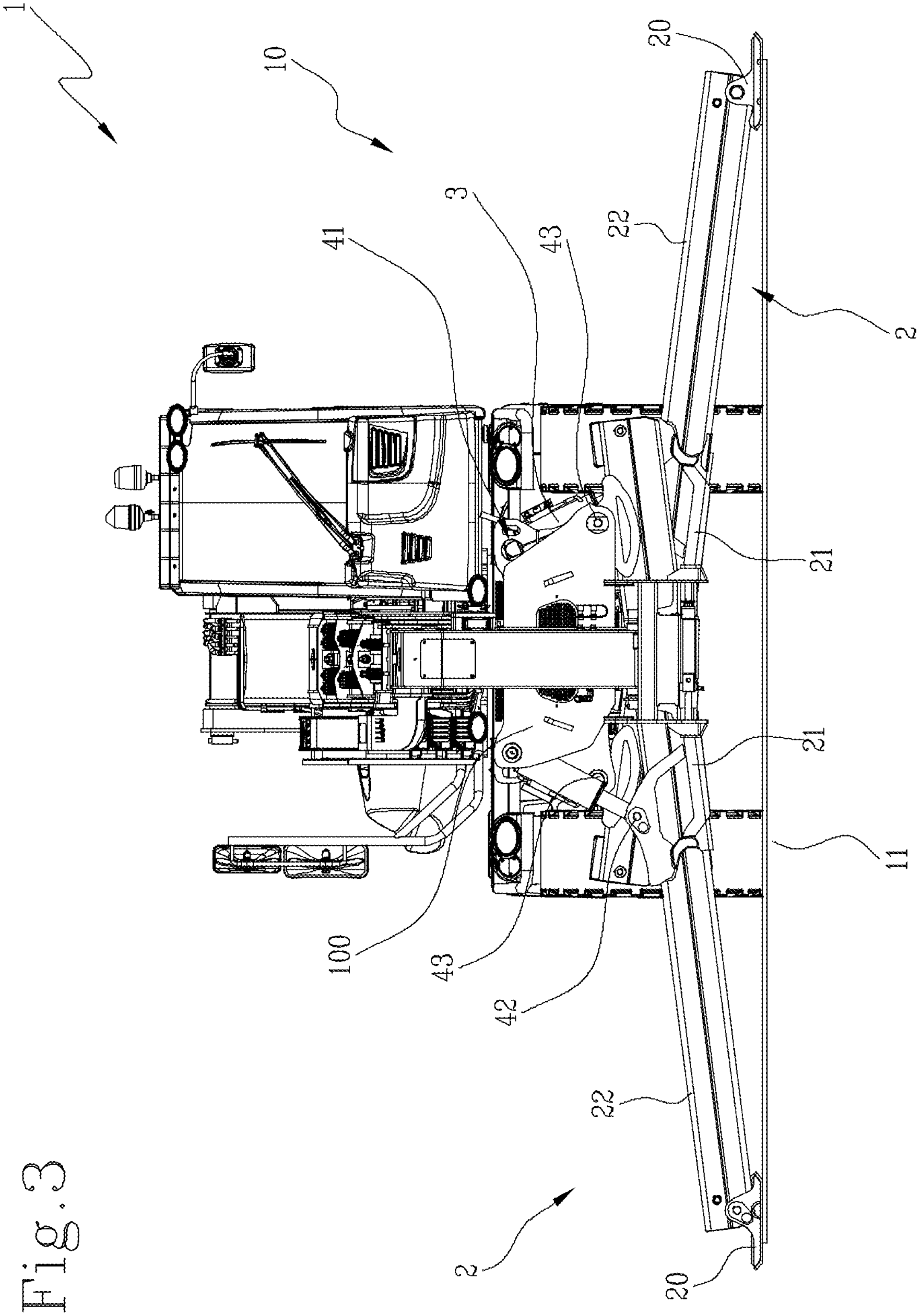

In the active configuration of the stabilisers, shown in FIG. 3, the arms 2 rest on the ground and detach the wheels from the ground, in such a way as to free the wheels from the load due to the weight of the vehicle. In short, the active configuration of the stabilisers is a configuration wherein the load of the vehicle, that is to say, the load due to the weight of the vehicle, is supported only by the arms 2, as shown in FIG. 3.

Figure 2:
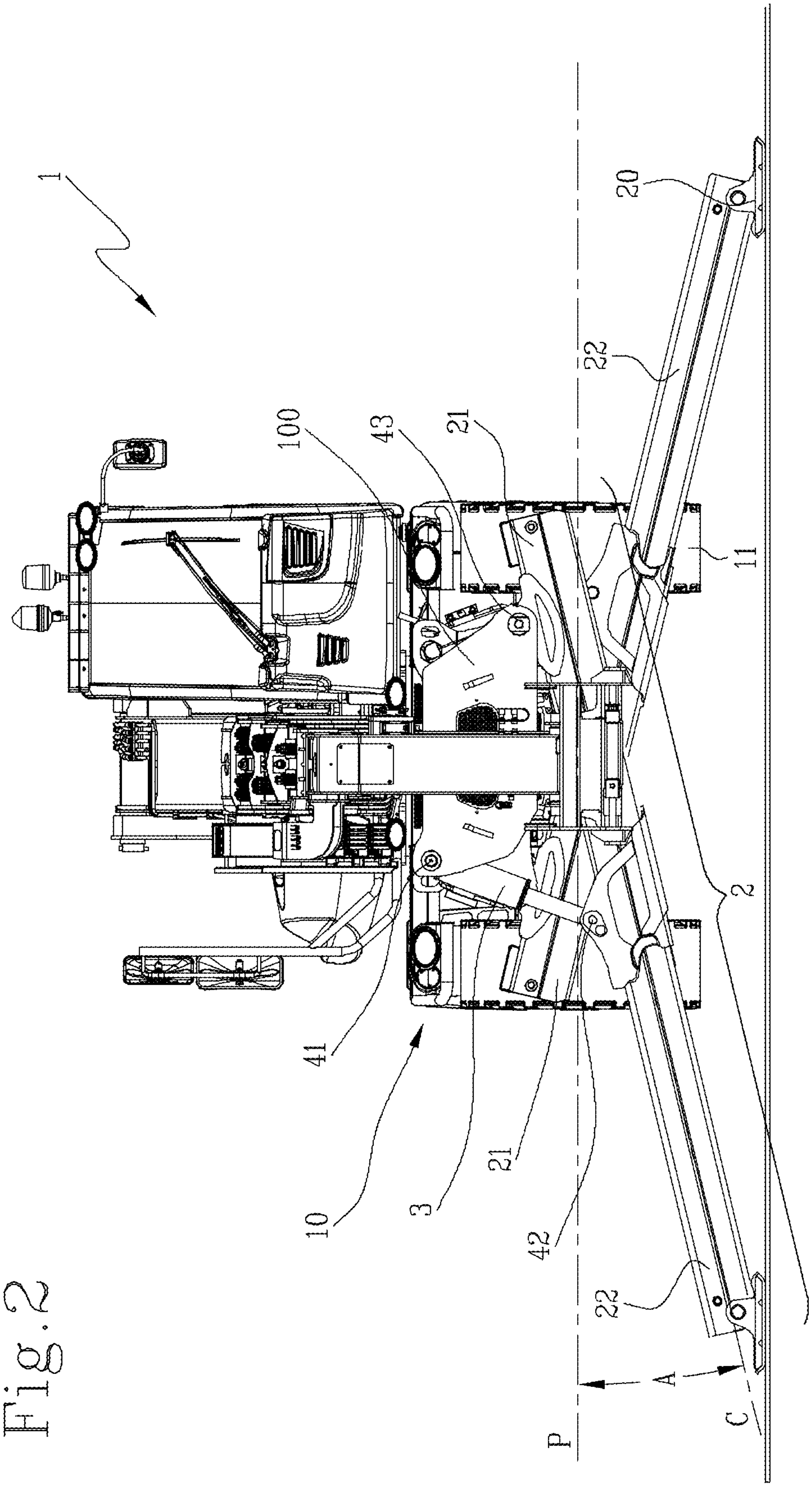
FIGS. 2-4 are front views of the machine of FIG. 1 which show different steps of the retraction sequence of the stabilisers included in the proposed system.

It is, however, possible that, when the arms 2 rest on the ground, the arms 2 do not stop the relative movement, but continue to move to lift further the wheels, as shown in FIG. 2. This may be necessary to level the vehicle in the presence of sloping or uneven ground, that is to say, non-horizontal ground.

In general, the active configuration of the stabilisers 10, that is to say, the position adopted by the arms 2 in the active configuration of the stabilisers, depends on the specific conditions in which the vehicle 1 is to operate, with particular reference to the type of ground on which the machine 1 must stabilise.

In effect, depending on the slope or the shape of the ground on which the vehicle 1 stabilises, the arms 2 may rest on the ground with variable inclinations and lengths.

According to the preferred but non-exclusive embodiment illustrated, each arm 2 comprises a first segment 21 and a second segment 22.

The first segment 21 is rotatable between a raised position and an operating position. The rotation of the first segment 21 causes the entire arm 2 to rotate between said raised and operating positions. In the description which follows, when speaking of rotation of an arm 2 reference is made to the rotation of the respective first segment 21, and vice versa.

It should be noted that, when this description refers to the angle of inclination of an arm 2 in a predetermined position, or the inclination of an arm 2 in a predetermined position, reference is made to the angle A between the longitudinal axis C of the arm 2, when the respective first segment 21 is in the raised position, and the longitudinal axis C in that predetermined position. In other words, the angles of inclination or the inclinations which will be mentioned are measured relative to the reference defined by the angular position of the longitudinal axis C when the first segment 21 of the arm 2 is in the raised position. The position of the longitudinal axis C of an arm 2 in the raised position of the respective first segment 21 is indicated with the line P in FIGS. 2 and 4. In performing the rotation from the operating position to the raised position, or vice versa, each first segment 21 and the relative arm 2 sweep a total angle of rotation which depends on the constructional characteristics of the stabilising device and the stabilising conditions.

The second segment 22 is slidable relative to the first segment 21 between an extended position and a closed position. The second segment 22 is also provided with a foot 20 for contact with the ground. The foot 20 is associated with a free end of the second segment 20.

The closed position is the position of minimum extension, or maximum retraction, of the second segment 22. Preferably, in this position, only the foot 20 protrudes from the first segment 21. In any case, it is possible that, in addition to the foot 20, also an end portion of the second segment 22 may protrude from the first segment 21.

When the first segments 21 are in the operating position and the second segments 22 are in the extended position, the stabilisers are in the active configuration. When the first segments 21 are in the raised position and the second segments 22 are in the closed position, the stabilisers are in the inactive configuration.

Preferably, but not necessarily, the first segment 21 is hollow. The second segment 22 is slidably inserted in the first segment 21. In particular, the second segment 22 is slidable relative to the first segment 21 between said extended position, where it protrudes from the first segment 21 for a longer stretch, and said closed position, where it protrudes from the first segment 21*a,b* for a shorter stretch. Preferably, in the closed position of the first segment 22, only the foot 20 protrudes from the first segment 21.

According to the preferred but non-exclusive embodiment illustrated, each segment 21, 22 comprises a rectilinear beam. The beam of the second segment 22 is inserted with the possibility of sliding in the hollow beam of the first segment 21.

The invention comprises first movement means 3, designed for individually rotating the first segments 21 between the raised position and the operating position. The rotation of the segments 21 determines the rotation of the respective arm 2 of which they are part.

Preferably, the first movement means comprise a hydraulic cylinder 3 for each arm 2.

More in detail, the first segment 21 of each arm 2 is connected to the supporting structure 100 by a first hinge 43; moreover, at the end of the movement of the arm 2 about the first hinge 43, use is made of said hydraulic cylinder 3, the thrust of which is used for lifting during the stabilising step.

Each hydraulic cylinder 3 is connected by a second hinge 41 to the supporting structure 100 and, through a third hinge 42, to the first segment 21 of the respective arm 2.

The first and the third hinge 42, 43 are positioned in two distinct points of the length of the first segment 21, preferably at the upper side, the first being further inside, that is closer to the proximal end of the first segment 21, and the third further outside, that is, closer to the distal end.

In practice, the hydraulic cylinders 3 are actuated with a pushing action to move the stabilisers to the active configuration, that is to say, to rotate the arms 2 towards the operating position and move the feet 20 to the ground, in such a way as to raise the vehicle 1, whilst they are actuated with a retraction action to move the stabilisers to the inactive configuration and return the vehicle 1 to rest on the wheels, with the arms 2 raised and retracted to a rest position.

In particular, the hydraulic cylinders 3 are actuated with a pushing action to rotate the first segments 22, and the relative arms 2, towards the operating position, whilst they are actuated with a retraction action to rotate the first segments 21 and the relative arms 2 towards the raised position.

The invention includes second movement means, for example comprising hydraulic cylinders (not shown), designed for moving individually the second segments 22 between the extended position and the closed position.

In practice, for the purposes of extending the second segment 22 outside the first segment 21, use is made of a hydraulic cylinder, inserted between the second segment 22 and the first segment 21 and connected to each other at opposite ends.

The system according to the invention includes a processing unit, designed for adjusting the movements of the stabilisers 10, as described in more detail below.

Generally speaking, it should be noted that, in this description, the processing unit is presented as divided into separate functional modules for the purpose of describing the functions clearly and completely.

In practice, the processing unit may consist of a single electronic device, also of the type commonly present on this type of machine, suitably programmed to perform the functions described; the various modules can correspond to hardware units and/or software forming part of the programmed device.

Alternatively or in addition, the functions can be performed by a plurality of electronic devices on which the above-mentioned functional modules can be distributed.

Generally speaking, the processing unit may have one or more microprocessors for execution of the instructions contained in the memory modules and the above-mentioned functional modules may also be distributed on a plurality of local or remote calculators based on the architecture of the network on which they are housed.

Advantageously, the processing unit is configured for controlling said first and second movement means in such a way that the stabilisers (10) are moved from the active configuration to the inactive configuration by means of movements which comprise at least one synchronous phase in which they actuate simultaneously:

at least one stretch of the rotation of the first segments 21, in the sense that it moves from the operating position to the raised position;

at least one stretch of the sliding of the second segments 22, in the direction from the extended position to the closed position.

In short, the processing unit is configured for commanding said first and second movement means in such a way that the stabilisers 10 are brought from the active configuration to the inactive configuration by means of movements which comprise at least one synchronous phase wherein the rotation of the first segments 21, towards the raised position, is actuated simultaneously with the sliding of the second segments 22 towards the closed position.

In other words, at least a part of the movements which carry the stabilisers 10 from the active configuration to the inactive configuration comprises a rotation of the first segments 21 which occurs simultaneously with the sliding of the second segments 22.

The synchronous phase according to the invention brings considerable advantages with respect to the prior art.

In effect, whilst in the prior art there are movements in sequence, with some movements which may be performed only after others, in the stabilising system according to the present invention at least a part of the movements which carry the stabilisers from the active configuration to the inactive configuration occur simultaneously, in the modes described above. That results in a considerable saving in time.

According to a first possible embodiment, the processing unit is configured for controlling said first and second movement means in such a way that said synchronous phase include a final stretch of the sliding of the second segments 22 towards the closed position, that is to say, a stretch of the sliding of the second segments 22 which ends in the closed position of the second segments 22. In other words, at least a final stretch of the sliding of the second segments 22, which extends from an intermediate position, located at a predetermined distance from the closed position, to the closed position, occurs simultaneously with a stretch of the rotation of the first segments from the operating position to the raised position. This means that, in each arm 2, the second segment 22 reaches the closed position before the first segment reaches the raised position.

According to a second possible embodiment, the processing unit is configured for commanding said first and second movement means in such a way that said synchronous phase comprises a final stretch of the rotation of the first segments 21 towards the raised position, that is to say, a stretch of the rotation of the first segments 21 which ends in the raised position of the first segments 21. In other words, at least a final stretch of the rotation of the first segments 21, which extends from an intermediate position, located at a predetermined angle from the raised position, to the raised position, occurs simultaneously with a stretch of the sliding of the second segments 22 from the extended position to the closed position.

According to a further possible embodiment, shown in the drawings, the processing unit is configured for moving the stabilisers 10 from the active configuration to the inactive configuration by means of movements which comprise the following steps:

rotating the first segments 21 from the operating position to an intermediate position AM;

said synchronous phase.

According to a possible embodiment, after the rotation of the first segments 21 from the operating position to an intermediate position Am, the control unit commands a sliding of the second segments 22 from the extended position to an intermediate position. After this sliding step, the control unit commands the synchronous phase. This allows the synchronous phase to start from configurations substantially equal in terms of inclination and extension of the arms 2.

In short, according to the embodiment shown in the drawings, the passage of the stabilisers 10 from the active configuration to the inactive configuration comprises the following steps.

Figure 4:
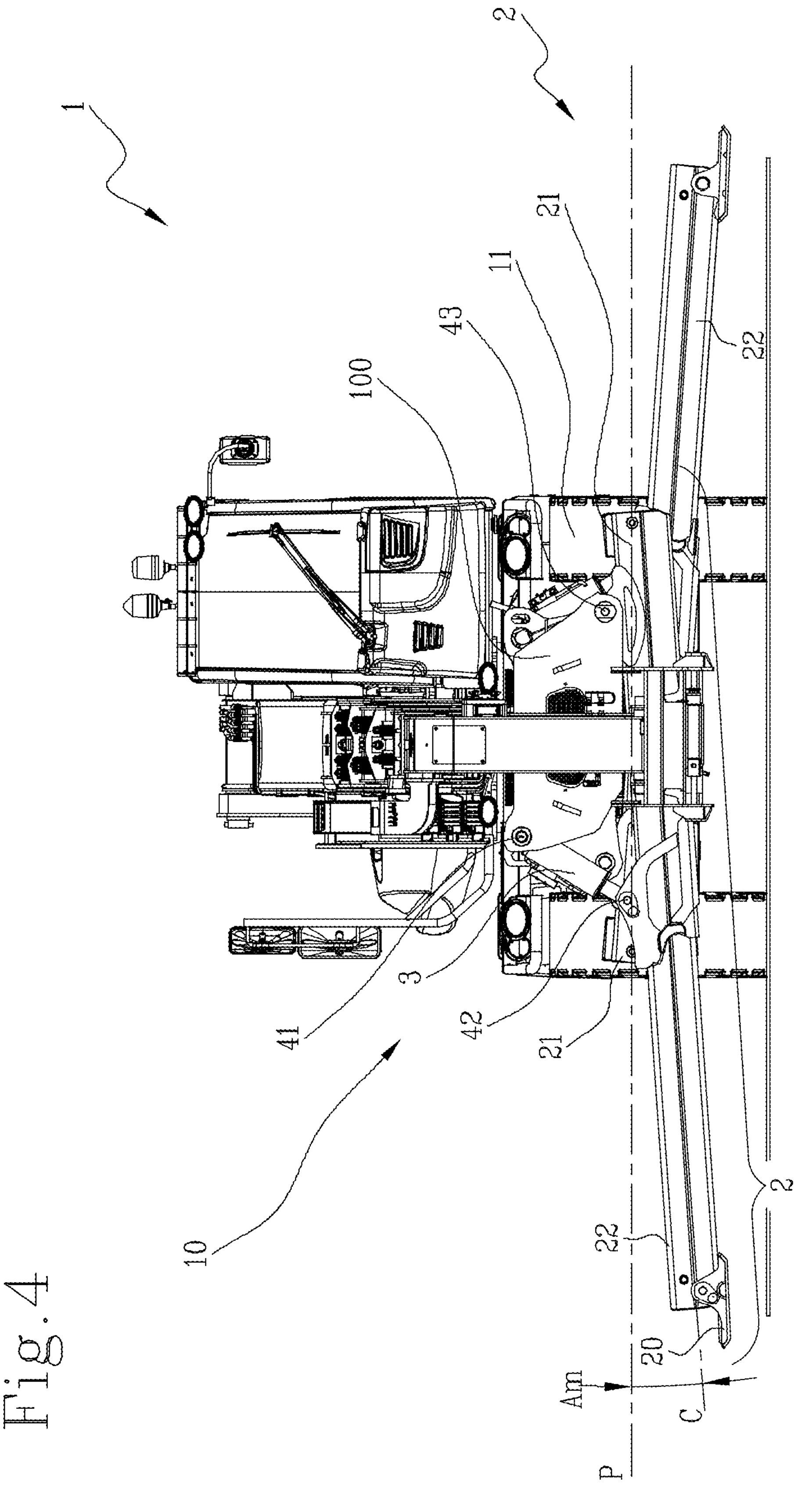

Initially, the processing unit commands the rotation of the first segments 21 from the operating position to an intermediate position Am (FIG. 4). This intermediate position is a position in which the wheels 11 of the vehicle 1 are positioned in contact with the ground and the feet 20 detach from the ground, as shown in FIG. 4, for a height sufficient to guarantee that the feet 20 do not slide on the ground.

Preferably, in the intermediate position, the angle of inclination Am of the arm 2 is greater than or equal to 50% of the total angle of rotation of the arm 2 between the raised position and the operating position of the respective first segment 21. In other words, the angle of rotation made by the first segments 21 from the operating position to the intermediate position Am is less than or equal to 50% of the total angle of rotation from the operating position to the raised position.

Figure 5:
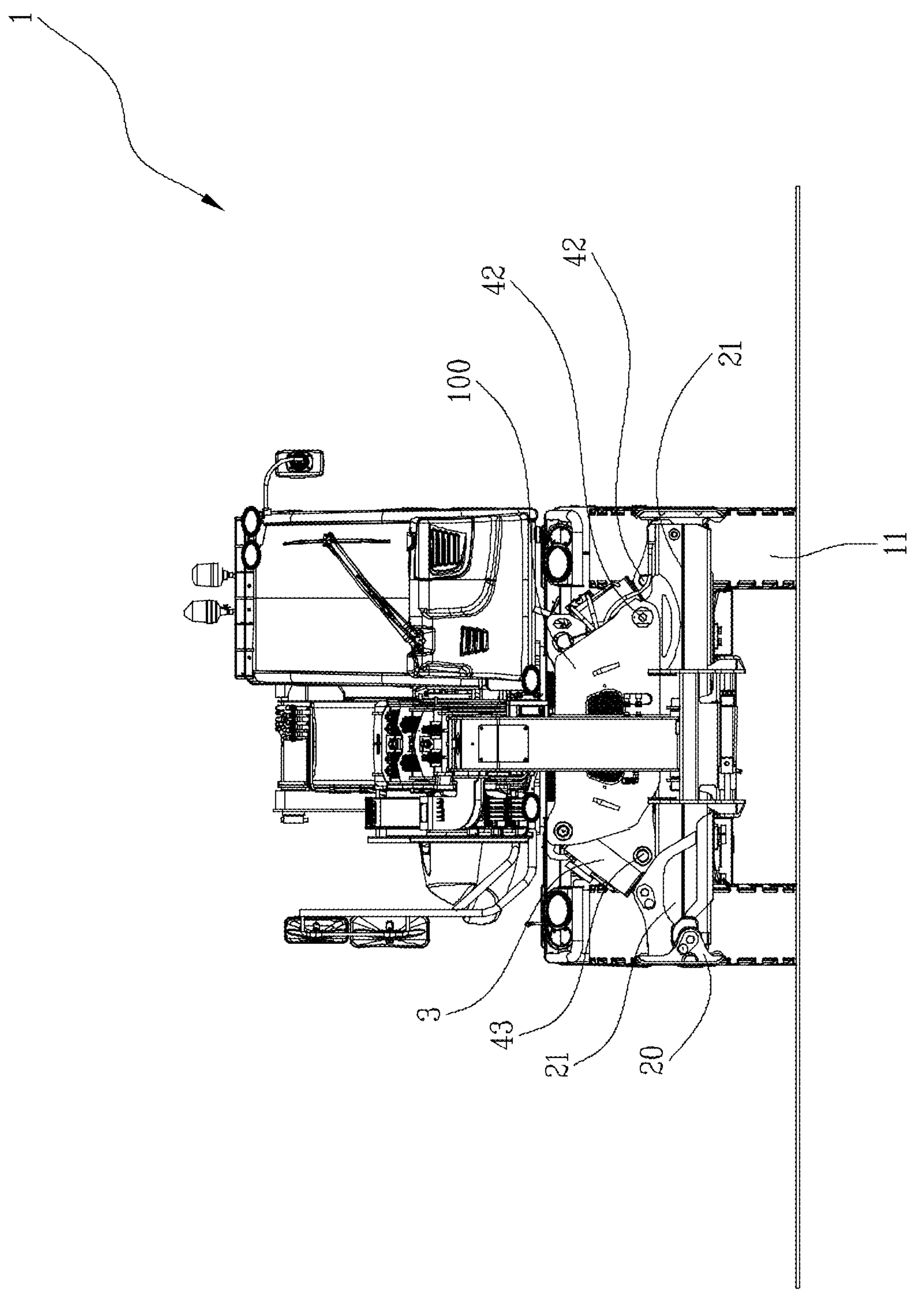
FIG. 5 is a front view of a stabilising unit which includes one of the two pairs of stabilising arms which are provided in the system according to the invention.

Upon reaching the intermediate position Am, the processing unit commands the actuation of the synchronous phase, during which, simultaneously, there is the rotation of the first segments 21 towards the raised position and the sliding of the second segments towards the closed position, until reaching the inactive configuration of the stabilisers, illustrated in FIG. 5. If necessary, but not necessarily, before the synchronous phase the control unit commands the sliding of the second segments 22 to an intermediate position.

According to a possible embodiment of the invention, the first of the steps described, that is, the rotation of the first segments 21 from the operating position to an intermediate position Am, is a direct rotation in one direction only. In other words, each arm rotates directly from the operating position to the intermediate position. As already mentioned, the intermediate position is substantially a position in which the feet 20 are detached from the ground by a certain height, as shown in FIG. 4.

According to a further possible embodiment of the invention, the first of the steps described, that is to say, the rotation of the first segments 21 from the operating position to an intermediate position Am, comprises a first rotation, which moves the first segments 21 beyond the intermediate position Am, that is to say, it moves the first segments to a reference position between the rest position and the intermediate position Am. Subsequently, a step is performed in which the first segments 21 rotate in the opposite direction from the reference position to the intermediate position (Am). According to this further embodiment of the invention, it can be guaranteed that the arms 2 of a stabiliser are positioned in intermediate positions Am symmetrical to each other with respect to a plane perpendicular to the reference plane P, even if the vehicle is on an inclined plane.

According to a further possible embodiment, the processing unit is configured for actuating the synchronous phase during the entire movement of the stabilisers 10 from the active configuration to the inactive configuration. In other words, according to this embodiment, the processing unit simultaneously actuates the rotation of the first segments 21 and the sliding of the second segments 22 from the active configuration to the inactive configuration of the stabilisers 10.

All the embodiments described considerably reduce the time necessary to move the stabilisers 10 from the active configuration to the inactive configuration.

Preferably, in the inactive configuration of the stabilisers 10, the arms 2 are inclined upwards, that is, relative to a horizontal plane, the ends which support the feet 20 are at a height higher than the ends pivoted to the supporting structure 100. This allows a further reduction in the transversal dimensions of the stabilisers, because the feet 20 are at a reciprocal distance less than the case in which, in the raised position, the arms are horizontal. Preferably, the inclination of the arms, in this configuration, is between 1° and 3°.

According to another possible embodiment, in the inactive configuration of the stabilisers 10, the arms 2 are substantially horizontal and parallel to each other. In the active configuration, and in at least a part of the intermediate configurations between the active and the inactive configuration, the arms 2 are crossed.

It should be noted that, preferably, the arms 2 of both the stabilisers 10 move in a synchronous fashion. In any case, a solution is possible wherein the arms 2 of a stabiliser move in a non-synchronous fashion with the arms 2 of the other stabiliser.

The invention therefore comprises a control of the retraction of the stabilisers which is significantly different from that used with the prior art systems.

In fact, whilst in the prior art systems the rotation of the first segments and the sliding of the second segments occur according to a predetermined sequence, the invention comprises a control wherein, at least for a part of the movements, the rotation of the first segments 21 and the sliding of the second segments 22 occur simultaneously. This allows a considerable interval of time to be saved.

The processing unit is connected to the commands located in the cabin of the machine, in such a way that the operator can operate the stabilisers 10 by means of a joystick, one or more switches or other commands.

In practice, acting continuously on a command, for example a joystick, a lever or the like, the arms 2 perform the movements described above to determine the passage from the active configuration to the inactive configuration of the stabilisers 10. The operator can interrupt the movements by simply releasing the command, for safety reasons.

The system according to this invention preferably comprises an electro-hydraulic distributor which controls the above-mentioned cylinders 3 which move in rotation and elongation (or retraction) the arms 2, that is to say, the first segments 21 and the second segments 22 of the arms 2.

The distributor is connected to the cylinders 3 and adjusts the operation on the basis of control signals arriving from the processing unit.

The control signals are produced by the processing unit for activating the cylinders 3 in the stabilising arms 2, in such a way as to perform the movements described above.

The invention may include first detection means, connected to the processing unit and configured for measuring the inclination of the arms 2 relative to a reference, for example relative to the position of the longitudinal axis C in the raised position of the arms 2 (reference P in FIGS. 2 and 4). According to an alternative embodiment, the reference could be defined by the plane in which the lower wall of the supporting structure 100 lies, or a plane parallel with it. According to a further alternative, the reference P is a horizontal plane.

The first detection means may comprise, for example, encoders and/or potentiometric angular position detectors, microswitches or proximity sensors. Generally speaking, the first detection means are configured to measure the angular position of the arms 2*a*, 2*b*. In other words, the first detection means are designed for producing an inclination signal as a function of the measurements taken, transmitted to the processing unit which controls the hydraulic distributor in accordance with the inclination signals received.

In any case, the first detection means allow the inclination of the arm 2 to be determined, that is, the angle formed by the first segment 21 and the reference P.

Moreover, the invention may include second detection means (not illustrated), connected to the processing unit and configured to measure the length of the projecting part of second segment 22 with respect to the respective first segment 21.

The second detection means are configured to measure and quantify the position of extraction of the second segments 22 relative to the respective first segments 21.

For example, the second detection means comprise a wired position sensor, provided with a winder, integral with the first segment 21*a*, 21*b*, the wire of which is connected to the second segment 22*a*, 22*b*, or vice versa. The winder is connected to an encoder or to an angular position transducer.

Alternatively, position sensors may be used which measure the distance of a fixed reference to the second segment 22*a*, 22*b* relative to the first segment 21*a*, 21*b* and so on. For example, it is possible to use linear potentiometric sensors.

In any case, whatever sensor is used, it is designed to generate an extension signal, representing the position of the second segment 22*a*, 22*b* relative to the first segment 21*a*, 21*b*, the signal being transmitted to the processing unit which, according to the signals received, controls the distributor so that it actuates the hydraulic cylinders in such a way as to produce the signals described above.

The control unit is configured to receive the signals coming from the first and second detection means and to control the first and second movement means in such a way as to carry out the above described steps according to this invention.

Preferably, the invention also comprises a pressure sensor, for example a cell with extensometers or a pressure switch, for each arm 2. The pressure sensor is designed for detecting the presence of a load acting on the relative arm 2 and for transmitting a corresponding signal to the control unit. The presence of a load indicates the contact between the foot 20 of the arm 2 and the ground or other contact element. The signal of the pressure sensor is used by the control unit for generating an alarm signal, configured to draw the attention of the operator to the load condition of the relative arm 2. This alarm signal allows the operator to be warned of potential dangerous conditions. For example, in the presence of the signal coming from a pressure sensor, the control unit prevents the retraction of the relative second segment 2 to prevent a sliding on the ground.

It should be noted that the processing unit comprises a memory module in which are recorded control parameters as a function of the positions of the first and second segments 21, 22.

Moreover, the processing unit may include a user interface configured to allow an operator to select or set up the control parameters.

The preferred operation of the invention is performed substantially in the following modes.

Once the planned operations have been concluded, during which the machine 1 has been stabilised, the operator in the cabin starts the steps for retraction of the stabilisers 10, using a special command.

As mentioned, the arms 2 move in a synchronised fashion and, more specifically, all four simultaneously.

Initially, the arms 2 raise by means of the rotation of the first segments 21 upwards, so that the wheels 11 firstly touch the ground, and then continue until reaching the predetermined intermediate position Am (FIG. 3).

In practice, in order to obtain this, the hydraulic cylinders 3 located between the first segments 21 and the supporting structure 100 are actuated in retraction fashion so as to rotate the first segments 21, and therefore the arms 2, to a position in which the first detection means detect the intermediate position Am.

At this point, the synchronous phase of the movements is actuated, wherein the first segments 21 rotate simultaneously with the sliding of the second segments 22, until the sensors of the second detection means signal to the processing unit that the second segments 22 have reached the closed position, determined on the basis of the respective control parameter stored, and the first segments 21 have reached the raised position, which can be measured by the first detection means (FIG. 5).

The invention is also configured as a method for controlling scissor-like stabilisers 10 of self-propelled operating machines 1 which can be actuated by means of the system described above.

According to the proposed method, starting from the active configuration of the stabilisers 10 (FIGS. 1 and 2), in which wheels of the machine 1 are raised from the ground surface and the arms 2 are oblique relative to the ground, with the second segments in the extended position and the feet 20 resting on the ground surface, the stabilisers 10 are brought to the inactive configuration (FIG. 4) by means of movements which comprise the synchronous phase already described, in which the following are performed simultaneously:

- at least one stretch of the rotation of the first segments (21), in the sense that it moves from the operating position to the raised position;
- at least one stretch of the sliding of the second segments (22), in the direction from the extended position to the closed position.

According to a first possible embodiment of the method synchronous phase comprises a final stretch of the sliding of the second segments (22) towards the closed position, that is to say, a stretch of the sliding of the second segments (22) which ends in the closed position of the second segments (22). According to a first possible embodiment of the method, the synchronous phase comprises a final stretch of the rotation of the first segments (21) towards the raised position, that is to say, a stretch of the rotation of the first segments (21) which ends in the raised position of the first segments (21).

According to a third possible embodiment of the method, preferred but not exclusive and shown in the drawings, the method according to the invention comprises the stabilisers (10) being carried from the active configuration to the inactive configuration by means of movements which comprise the following steps:

- rotating the first segments (21) from the operating position to an intermediate position AM;
- actuation of the synchronous phase.

According to this third possible embodiment of the method, the arms 2 rotate from the operating position of the first segments 21 to the intermediate position Am, wherein the wheels 11 rest on the ground and the arms 2 are detached from the ground (FIG. 4). The synchronous phase is then actuated, wherein rotation of the first segments 21 and sliding of the second segments 22 occur simultaneously, in the modes described above, until reaching the inactive configuration of the stabilisers 10, wherein the first segments 21 are in the raised position and the second segments are in the closed position.

According to a possible embodiment of the method, after the rotation of the first segments (21) from the operating position to an intermediate position Am, a sliding of the second segments (22) from the extended position to an intermediate position is actuated and the synchronous phase is then actuated. This allows the synchronous phase to be actuated starting from configurations substantially equal in terms of inclination and extension of both arms.

According to a further possible embodiment of the method, the synchronous phase occupies the entire movement of the stabilisers (10) from the active configuration to the inactive configuration. In particular, the method comprises simultaneously the rotation of the first segments 21 and the sliding of the second segments 22 from the active configuration to the inactive configuration of the stabilisers 10.

As already mentioned, in the inactive configuration of the stabilisers 10 the arms 2 have a minimum length, so that the stabilisers 10 define the minimum lateral dimensions of the machine.

In the active configuration of the stabilisers 10, the arms 2 have a maximum length and the wheels 11 are detached from the ground, in such a way that the load of the vehicle is supported by the arms 2.

Moreover, the invention is configured also as a computer program which, running on an electronic processing unit, implements the steps of the proposed method.

The invention claimed is:

1. A method for controlling a scissor stabiliser (10) of a self-propelled operating machine (1) comprising at least one pair of rotatable telescopic stabilising arms (2), wherein each arm of the at least one pair of rotatable telescopic stabilising arms (2) comprises:

- a first segment (21) rotatable between a raised position and an operating position;
- a second segment (22), slidable relative to the first segment (21) between an extended position and a closed position and provided with a foot (20) for contact with the ground;
- wherein the scissor stabiliser (10) can be activated between an active configuration, in which the first segments (21) are in the operating position and the second segments are in the extended position with the relative feet (20) resting on the ground, in such a way that wheels (11) of said self-propelled operating machine (1) are raised from the ground surface, and an inactive configuration, in which the first segments (21) are in the raised position and the second segments (22) are in the closed position, in such a way that the wheels (11) rest on the ground;
- wherein the scissor stabiliser (10) is brought from the active configuration to the inactive configuration by means of movements which comprise a synchronous phase in which the first segments (21) and the second segments (22) actuate simultaneously such that at least one stretch of the rotation of the first segments (21)

from the operating position to the raised position occurs simultaneously with at least one stretch of the sliding of the second segments (22) from the extended position to the closed position.

2. The method according to claim 1, wherein said synchronous phase comprises a final stretch of the sliding of the second segments (22) towards the closed position, wherein said final stretch of the sliding of the second segments (22) ends in the closed position of the second segments (22).

3. The method according to claim 1, wherein said synchronous phase comprises a final stretch of the rotation of the first segments (21) towards the raised position, wherein said final stretch of the rotation of the first segments (21) ends in the raised position of the first segments (21).

4. The method according to claim 1, wherein the scissor stabiliser (10) is moved from the active configuration to the inactive configuration by means of movements which comprise the following steps:

rotating the first segments (21) from the operating position to an intermediate position;

before said synchronous phase.

5. The method according to claim 4, comprising a step of sliding the second segments (22) from the extended position to the intermediate position, after said step of rotating the first segments (21) from the operating position to the intermediate position and before said synchronous phase.

6. The method according to claim 5, wherein the intermediate position is a position in which the wheels (11) rest on the ground and the feet (20) are raised above the ground, but closer to the ground than in the inactive position.

7. The method according to claim 1, wherein said synchronous phase occupies the entire movement of the scissor stabiliser (10) from the active configuration to the inactive configuration.

8. The method according to claim 1, wherein, in the inactive configuration of the scissor stabiliser (10), the at least one pair of rotatable telescopic stabilising arms (2) are inclined upwards.

9. The method of claim 8, wherein, in the inactive configuration of the scissor stabiliser (10), the at least one pair of rotatable telescopic stabilising arms (2) are inclined between 1° and 3° above a horizontal plane.

10. The method according to claim 1, wherein in the closed position of the second segments (22), the at least one pair of rotatable telescopic stabilising arms (2) have a minimum length.

11. A computer program which, when run on an electronic processing unit, carries out the steps of the method according to claim 1.

12. The method according to claim 1, wherein the scissor stabiliser (10) is moved from the active configuration to the inactive configuration by means of movements which comprise the following steps:

rotating the first segments (21) in a direction from an operating position to a reference position, such that the first segments (21) are rotated through and beyond an intermediate position;

rotating the first segments (21) in an opposite direction from the reference position to the intermediate position;

before said synchronous phase.

13. The method according to claim 12, comprising a step of sliding the second segments (22) from the extended position to the intermediate position, after said step of rotating the first segments (21) from the reference position to the intermediate position and before said synchronous phase.

14. A stabilising system for a self-propelled operating machine (1) comprising at least two scissor stabilisers (10), designed to adopt an active configuration, in which the at least two scissor stabilisers (10) stabilise said self-propelled operating machine (1) lifting the wheels (11) of the self-propelled operating machine (1) from the ground surface, and an inactive configuration, in which said wheels (11) are rested on the ground, wherein:

each of the at least two scissor stabilisers (10) comprise at least one pair of rotatable telescopic stabilising arms (2);

each arm of the at least one pair of rotatable telescopic stabilising arms (2) comprises a first segment (21), rotatable between a raised position and an operating position, and a second segment (22), slidable relative to the first segment (21) between an extended position and a closed position and provided with a foot (20) for contact with the ground surface;

first movement means (3), designed for rotating the first segments (21) between said raised position and said operating position;

second movement means, designed for moving the second segments (22) between said closed position and said extended position;

wherein the stabilising system comprises a processing unit configured for controlling said first and second movement means in such a way that the at least two scissor stabilisers (10) are moved from the active configuration to the inactive configuration by means of movements which comprise at least one synchronous phase in which the first segments (21) and the second segments (22) actuate simultaneously such that at least one stretch of the rotation of the first segments (21) from the operating position to the raised position occurs simultaneously with at least one stretch of the sliding of the second segments (22) from the extended position to the closed position.

15. The stabilising system according to claim 14, wherein said processing unit is configured for controlling said first and second movement means for actuating said synchronous phase including a final stretch of the sliding of the second segments (22) towards the closed position, wherein said final stretch of the sliding of the second segments (22) ends in the closed position of the second segments (22).

16. The stabilising system according to claim 14, wherein said processing unit is configured for controlling said first and second movement means for actuating said synchronous phase including a final stretch of the rotation of the first segments (21) towards the raised position, wherein said final stretch of the rotation of the first segments (21) ends in the raised position of the first segments (21).

17. A self-propelled operating machine (1) comprising a stabilising system according to claim 16.

18. The stabilising system according to claim 14, wherein the at least two scissor stabilisers (10) comprise, for each pair of rotatable telescopic stabilising arms (2), a support structure (100) designed to be fixed to a frame of the self-propelled operating machine (1), to which the first segments (21) are hinged, in which the relative second segments (22) are inserted with the possibility of sliding, wherein the stabilising system comprises:

first detecting means, connected to said processing unit and configured to measure the inclination of each arm of the at least one pair of rotatable telescopic stabilising arms (2) with respect to a reference plane (P) that is fixed with respect to said structure (100);

second detecting means, connected to the processing unit and configured to measure the length of a part of each second segment (22) that is projecting with respect to the respective first segment (21);

an inclination module, included in the processing unit, configured for detecting whether the at least one pair of rotatable telescopic stabilising arms (2) are in an intermediate position, in which they are inclined relative to the reference plane by an intermediate angle (Am), or in the raised position;

an extension module, included in the processing unit, configured for detecting whether the second segments (22) are in the extended position or in the closed position.

19. The stabilising system according to claim 18, wherein the intermediate angle (Am) is greater than or equal to 50% of a total angle of rotation of the first segment (21) from the raised position to the operating position.

20. The stabilising system according to claim 14, wherein, when the at least two scissor stabilisers (10) are in the active configuration on sloped or uneven ground, the first segments (21) are at variable inclinations or the second segments (22) are at variable lengths.

* * * * *